United States Patent [19]

Mohn

[11] 3,853,767

[45] Dec. 10, 1974

[54] PUMPING APPARATUS FOR SKIMMING AND RECOVERING AN OIL LAYER FROM A BODY OF WATER

[75] Inventor: Frank Mohn, Fana, Norway

[73] Assignee: Patents and Developments A/S, Nesttun, Norway

[22] Filed: Apr. 14, 1972

[21] Appl. No.: 244,010

[30] Foreign Application Priority Data
Apr. 23, 1971 Norway.............................. 1522/71

[52] U.S. Cl............................ 210/242, 210/DIG. 21
[51] Int. Cl............................................. E02b 15/04
[58] Field of Search................ 210/242, DIG. 21, 83

[56] References Cited
UNITED STATES PATENTS

| | | | |
|---|---|---|---|
| 3,635,342 | 1/1972 | Mourlon et al.................. | 210/242 X |
| 3,701,429 | 10/1972 | Schell.................................. | 210/242 |
| 3,741,391 | 6/1973 | Donsbach........................... | 210/242 |

FOREIGN PATENTS OR APPLICATIONS

| | | | |
|---|---|---|---|
| 1,284,363 | 4/1969 | Germany..................... | 210/DIG. 21 |

*Primary Examiner*—Theodore A. Granger
*Attorney, Agent, or Firm*—Dean S. Edmonds

[57] ABSTRACT

The disclosed apparatus for recovering oil floating on the surface of a body of water comprises a bowl for skimming and collecting oil from the surface of the water, means for supporting the bowl with its peripheral edge surface located at the surface of the water while its body portion therebelow extends downwardly below the level of the body of water, said bowl having a central downwardly and inwardly inclined upper surface, a pump for pumping recovered oil from the central lower portion of the bowl, a plate outside and surrounding the bowl for directing water and oil toward the peripheral edge of the bowl where oil is separated from water, said plate having a central downwardly and inwardly inclined portion below the bowl having a bottom water outlet passageway, and a water pump connected into the water outlet passageway for drawing water and oil over the peripheral surface of the plate to the peripheral edge of the bowl and for drawing water on through the space between the plate and bowl and out the said passageway. The pump may be located in the bowl, for example, in a chamber which surrounds the pump and is provided with oil flow passageways leading into the chamber.

5 Claims, 2 Drawing Figures

PATENTED DEC 10 1974 3,853,767

PUMPING APPARATUS FOR SKIMMING AND RECOVERING AN OIL LAYER FROM A BODY OF WATER

The present invention relates to a pumping apparatus for separate pumping of liquids in layers, for example, oil on water. The pumping apparatus or system is particularly adapted for use when pumping of oil from oil spill. Oil discharged onto water spreads over a large area in a very thin layer, and great problems arise in separating the thin layer of oil from the water, so as to be able to recover the oil and prevent pollution of beaches.

Pumps have previously been proposed for this purpose in the form of a float-supported construction which floats at a determined height in the water and is intended to separate water from oil.

The previously known proposals have not been very successful, however.

A further object and purpose of the invention is to provide an oil recovery pumping system which, in a simpler manner and thus more reliably, is adapted to separate oil from water at the level of the water, so that expensive and time-consuming centrifuging is avoided.

In accordance with the invention this is primarily achieved in that an oil pump is surrounded by a bowl or disc, the periphery of which is adapted to be positioned exactly at the plane of separation between water and oil. This precise adjustment can be done by means of the adjustable floats. The periphery of the disc will then, when correctly positioned, effect the first separation of oil from water. The oil pump is disposed in the center of the bowl or disc and, in order further to separate the oil from the water also at the center portion of the bowl, a chamber may be provided having inlets which are aligned with or somewhat lower than the periphery of the bowl, the oil concentration over the central portion of the bowl being substantially greater than that outside. In order that the oil-covered water can be brought to the bowl in large amounts, a plate is arranged beneath the bowl which plate is provided at its center with a powerful pump for circulation of the water. When this pump is in operation, large amounts of surface water will be drawn toward the bowl and the plate and, on flowing over the plate to the pump thereof, the oil will trickle over the periphery of the bowl together with very small amounts of water. The water is drained from the central portion of the bowl through channels which open toward the plate.

The invention thus relates to an oil skimming and pumping system or apparatus with the features and characterizations disclosed in the claims.

The invention is explained further in the following with reference to the drawing where:

Figure 1:
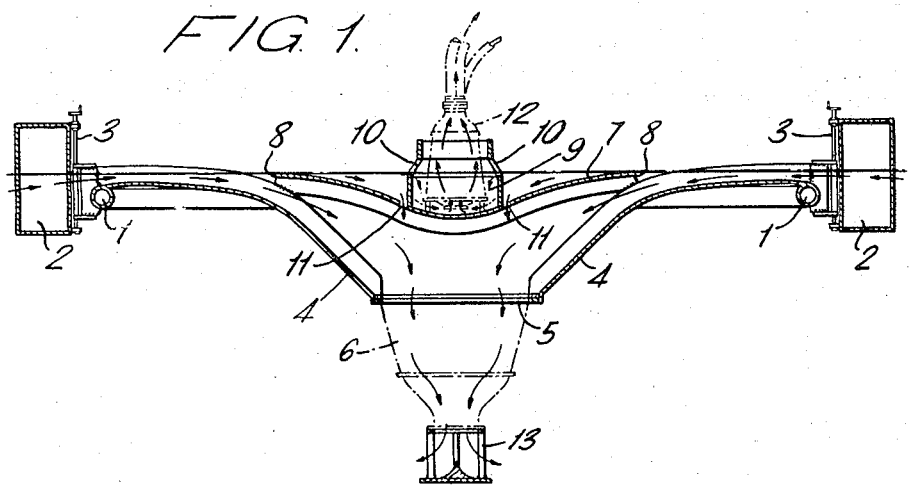
FIG. 1 is a section through a pumping system effected in accordance with the invention.

In the illustrated embodiment, the pumping system comprises a rigid tube construction 1 which is supported in the water by floats 2. The floats are adjustable in upward and downward direction by means of a screw 3, so that the support construction 1 can be made to float at the desired height in the water. To the tube 1, a collecting plate 4 is secured said plate being of inverted generally conical or bowl shape with downwardly and inwardly inclined upper surfaces at the central portion thereof and having a central through-passage 5 leading into a powerful pump 6. Above the plate 4, a bowl 7 is mounted which also has an inverted dome-shaped central portion and the periphery 8 of the bowl 7 is, by adjustment of the floats 2, brought to lie as exactly as possible in the plane of separation between the water and oil when it is the oil which is to be pumped. The bowl 7 and the plate 4 are secured together in spaced relation, as by welding, indicated in FIG. 1. In the central portion of the bowl 7, a chamber 9 is arranged having inlets 10, the lower limiting edge of which in the illustrated example being somewhat lower than the periphery 8 of the bowl 7. The difference in level of the lower limitation of the inlets 10 and the periphery 8 is adapted to the increase in oil concentration obtained when the oil-covered water floats over the periphery 8. On the outside of the chamber 9 channels 11 are provided which lead from the central portion of the bowl to the area above the plate 4. In the chamber 9 a pump 12 is mounted which is operated by suitable means, for example, hydraulic means, in the same manner as the pump 6.

When the pump 6 is in operation, large amounts of oil-covered water are drawn in over the plate 4 and, at the periphery 8 of the bowl 7, oil and small amounts of water are skimmed off. Water accompanying the oil into the bowl 7 is collected around the bottom of the chamber 9 on the outside thereof and drains out at the bottom through channels 11; the oil, which is substantially freed from water, flowing through the inlet openings 10 to the chamber 9 and being further transported by the pump 12. The pump 6 is substantially larger than the pump 12 and, for a means effected in accordance with the invention with a diameter of 4 metres, the pump 6 is of such a capacity that it pumps 1,000 tons of water per hour, while pump 12 need not have a capacity of more than a tenth part of this.

In order that the outflow from the pump 6 shall have no effect on the height at which the oil separating and recovery means is floating, the pump is provided at the lower part thereof with a means 13 which diverts the outflow from the pump so that the issuing streams of water are directed radially and not in excess of any lifting power which will effect the depth at which the oil separating and recovery means is floating.

Figure 2:
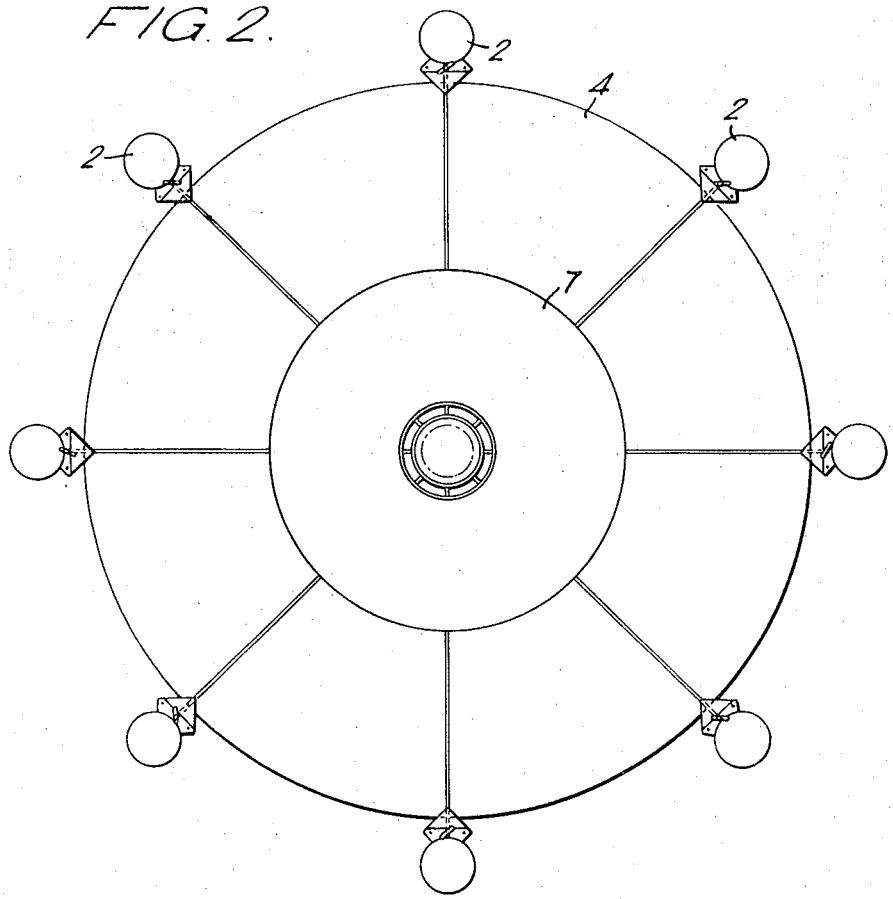
FIG. 2 is a view of the pumping system viewed from above.

As illustrated on FIG. 2, the bowl 7 and the plate 4 are circular and are supported by eight floats which are uniformly distributed around the periphery. The said diameter of 4 metres can, of course, be increased or reduced in accordance with existing requirements; however, an oil skimming and recovery apparatus with the said dimension has proved to be efficient and yet easy to transport, for example, by helicopter.

In this description, oil-on-water is mentioned as example; however, the pump can equally well be used for separation of other liquids in layers, and for separation of industrial waste.

Having described my invention, I claim:

1. Apparatus for recovering oil floating on the surface of a body of water comprising a bowl for skimming and collecting oil from the surface of the water, means for supporting the bowl with its peripheral edge surface located at the surface of the water while its body portion therebelow extends downwardly below the level of the body of water, said bowl having a central downwardly and inwardly inclined upper surface, a pump and a pump inlet for pumping recovered oil from the central lower portion of the bowl, a plate below and spaced from the under surface of said bowl, said plate having an outer peripheral surface for directing water and oil toward the peripheral edge of the bowl where oil is separated from water, said plate having a central downwardly and inwardly inclined portion below the bowl, said central downwardly and inwardly inclined portion having a bottom outlet passageway, means for drawing water and oil over the peripheral surface of said plate toward and over the peripheral edge of said bowl, said means also drawing water through the space between said plate and said bowl and out the said passageway, said means including a water pump connected into said water outlet passageway, and the lower portion of said bowl being provided with a channel for the flow of water to the plate below.

2. An apparatus as claimed in claim 1, including means at the discharge side of the water pump for directing streams of water from the water pump laterally into the body of water below the water pump.

3. An apparatus as claimed in claim 1, including a central chamber in the bowl having a wall surrounding the oil pump inlet, said wall having inlets for the flow of oil from the bowl into said chamber.

4. An apparatus as claimed in claim 3, wherein the bowl outside said chamber is provided with a channel for the flow of water to the plate below.

5. An apparatus as claimed in claim 1, wherein the bowl is secured to the plate in spaced relation thereabove.

* * * * *